United States Patent Office 3,634,578
Patented Jan. 11, 1972

3,634,578
METHOD FOR MOLDING A HOLLOW ARTICLE
Tadao Suzuki, 266 Maedaminami-cho,
Toyohashi-shi, Aichi-ken, Japan
Filed Sept. 30, 1969, Ser. No. 862,326
Claims priority, application Japan, Oct. 19, 1968,
43/76,231
Int. Cl. B29c 5/04, 6/00
U.S. Cl. 264—275                                      5 Claims

ABSTRACT OF THE DISCLOSURE

Method of forming a hollow article wherein a perforated core containing thermoplastic resin powder is placed within a mold cavity which is heated to effect melting of the resin which flows into the clearance between the core and cavity.

---

This invention relates to a process for manufacturing hollow articles having a heat resistant material as a core. In particular, this invention relates to a process of the class described which employs a rotatable and closable mold provided with a cavity of desired shape. Thermoplastic resin powders are placed in the cavity along with the core and the mold is heated and rotated, thus causing the entire outer surface of the core to be covered with the resin layer in the mold.

To my knowledge, there has never existed a satisfactory method of covering the entire surface of a hollow core with synthetic resin. For example, if an iron ball is employed as a hollow core, there is no suitable method for covering uniformly the entire surface of the iron ball with synthetic resin in one operation. At present, therefore, either the ball is coated with paint, or different portions of its surface are covered in separate steps.

Additionally, it is known to manufacture a hollow molded article by placing an insufficient quantity of thermoplastic resin powder in the cavity of a closed mold and heating the mold from outside while rotating it to melt resin on the surface of the mold cavity. This method is used, however, only for manufacturing molded article from resin powder itself, and is not practically applied for covering the entire surface of a hollow core with thermoplastic resin. This is so because, if a hollow core is placed in a mold cavity and thermoplastic synthetic resin powders are filled between the mold cavity and core, the resin powders cannot uniformly cover the core, because the resin layer cannot fill up the space between the hollow core and mold cavity, owing to the decrease of apparent volume of the resin powders which occurs as they are melted.

According to the present concept, the hollow core is perforated and an excessive quantity of resin is stored in the core at the early stage of the molding operation for release through the perforations in the core towards the surface of mold cavity as the resin between the hollow core and the cavity surface reduce in apparent volume during melting. In this way, the clearance between the hollow core and mold cavity is filled up with resin.

By means of the foregoing process, I have been able to achieve uniform covering of a hollow core with thermoplastic resin powders.

Thus, the present invention is directed to a process for preparing hollow molded articles having heat-resistant material as a core which comprises, providing a closable mold having a cavity of desired shape, placing a hollow, perforated core of heat resistant material and thermoplastic resin in the cavity, the thermoplastic resin being contained in the core when placed in the cavity, closing the mold, and heating the mold from outside thereof while rotating same.

Further specific features and advantages of the invention will be hereinafter more fully set forth with reference to the annexed drawings, showing a presently preferred embodiment of the invention and certain modifications thereof, in which.

According to my invention, it is necessary to provide the mold with a cavity of desired shaped an to be able to rotate same. It is a matter of course that the mold should be closable, because raw materials must be supplied into the mold and the molded article must be removed out of the mold when molding process has been completed.

Figure 4:
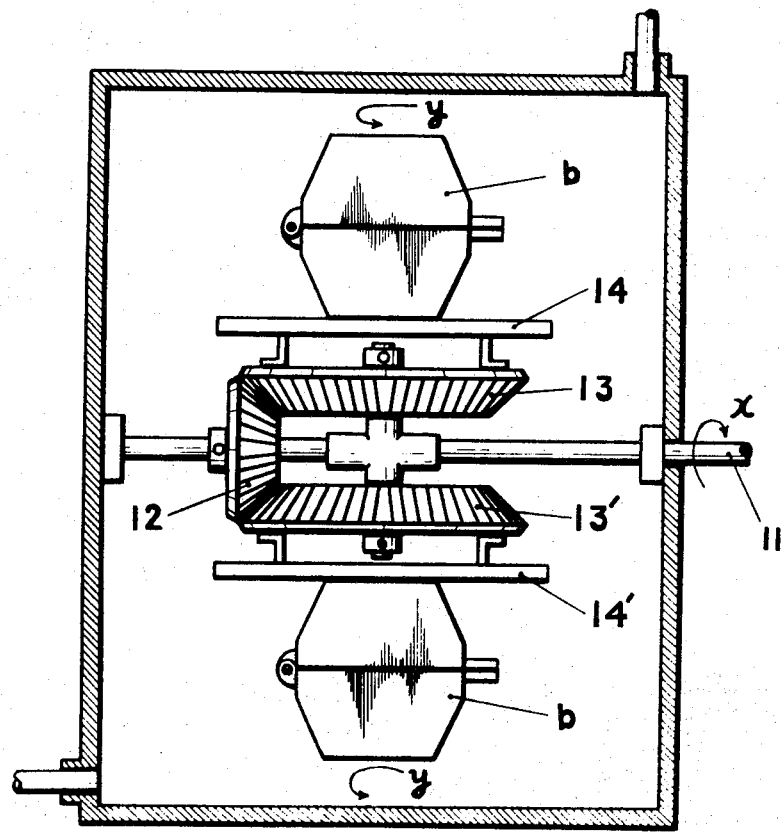
FIG. 4 is a sectional view of an example of the apparatus to be used in this invention.

In this case, rotation may be in one direction, but sometimes it is necessary for the mold to rotate in two directions, and since the purpose of rotating the mold is to disperse resin powders to every location of a cavity, the rotating conditions of the mold are determined by the shape of a cavity in the mold. For example, if a mold cavity is a true globe, then the mold may be turned around only one axis to obtain a satisfactory result. As show in FIG. 2, it is convenient to provide an axis 5 of rotation, and obliquely joining a rod 6 to the end of the axis, and fixing a mold b obliquely to the end of said rod, and then to rotate said axis. Such an arrangement is one of the simplest. Even if the mold cavity is a true globe, it is effective to have the mold rotate around two axes. In this case, it is effective to select two axes either of which crosses the cavity of mold. Another example of the mold rotating around two axes is shown in FIG. 4.

In some cases, it is difficult, depending on the shape of a cavity in the mold, to disperse resin powders to every corner or location of a cavity, even if the mold is rotated around two axes. In such case, it is advantageous to place beforehand a small piece molded of the same resin as the resin powders in the shape of a clearance wherein it is difficult to disperse resin powders. If such small piece is placed at a clearance between the core and cavity of the mold, it is sometimes very convenient because such small piece prevents the core from changing its position in the cavity.

In this process, the hollow core may be composed of a number of parts; however, it is required that each part be combined into a whole body while rotated in a cavity, so I shall refer to it as a single hollow core.

It is necessary that the core be composed of heat resistant material having a higher melting point than that of the thermoplastic resin to be used so that the core material will not be deformed by heat when it is heated up to the temperature sufficient to melt the resin. Accordingly, it goes without saying that the hollow core may be made of other thermoplastic material having higher softening point than that of the thermoplastic resin to be used. The core material may also be made of plastic cellular material.

As stated, it is necessary for the hollow core to be perforated. Perforation is required to allow the resin, preferably in powder form, or air to flow into the inner part of hollow core, or to allow the resin powders or air to flow out from inside of hollow core. Since the holes are made only for the purpose of smooth flow-in and flow-out of thermoplastic resin powders in radical expression, it is theoretically acceptable if only one hole is used.

Incidentally, if mechanical strength is required on the hollow core, then a rib, etc., for reinforcement may be provided in a proper place inside the core. For example, if the core is made of metal plate having a certain thickness and if a part weak in mechanical strength exists, then the use of a reinforcing rib will especially bring a good effect.

Although it is preferred to make the shape of the core similar to that of the mold cavity, it is not always necessary to make a similar shape. The size of the core should be, of course, smaller than that of the cavity, since the hollow core must be placed inside the cavity.

In this process, thermoplastic resin powders, typically polyethylene, are used as one of the materials. As to size of the powders, smaller particle size in preferred, but theoretically, it is satisfactory as long as the powders pass freely through the holes of the core.

As for the amount of thermoplastic resin powers to be employed, it must be more than the amount just necessary to fill up all clearance between the outer surface of core and the surface of the mold cavity when the powders are melted. Usually, an amount of resin powders is preferably employed such that melted resin fills up the clearance as well as the holes on the core and the remaining melted resin forms a thin film at some places around the holes inside the hollow core.

The thermoplastic resin powders are placed inside the hollow core. This, however, does not mean that all thermoplastic resin powders must be put inside the hollow core. Some of the powder may be placed in the clearance between the mold cavity and the hollow core. However, some portion of the powder must be placed inside the hollow core. This is because the resin, when in powder form, is larger in volume than when melted. This invented process adopts a new means in which resin powders are stored inside the hollow core while they are in powder form, and flow out from the hollow core through holes therein to form a covering layer. By such means, it has become for the first time possible to cover the entire surface of the hollow core at one time.

In this process, a perforated hollow core and resin powders contained therein are placed in a cavity mold and the mold is closed, then the mold is heated from outside thereof while being rotated. To heat the mold, the mold itself may be placed into a furnace or may be subjected to contact with a heating medium. As mentioned above, the mold is rotated simultaneously with heating. The resin flows out of the hollow core through holes therein and melts upon contacting the cavity surface and finally covers the entire outer surface of the hollow core. As far as there remains clearance between the outer surface of the hollow core and the cavity surface, the resin flows out from inside of the hollow core, and thus the entire outer surface of the core is covered with resin while excess resin remains in the perforated holes of the core and in close contact with inner wall of the hollow core, so that the covering layer of resin adheres firmly to the hollow core. In this way, the covering layer takes root in the hollow core and is anchored to it.

After the covering layer is thus formed, the mold is cooled either naturally or forcibly and is opened for removal of the molded article. It is convenient to cool the mold while rotating same.

In this process, since the resin powders are put into the hollow core and the necessary amount of powders flow out from the core to complete the covering, no special attention is required to the amount of resin powders to be used, thus making this operation a simple one. If the mold is cooled while it is rotated, the core can be supported in the center, which prevents the core from being at one side. Besides, according to this process, it is possible to increase the thickness of the covering resin layer with the same mold by changing the size of the core and the amount of resin powders. Further, by this process, only one operation enables me to cover the entire surface of the hollow core at a time.

As a special procedure of this invented process, small molded pieces made of the same resin as the resin powders may be interposed between the mold cavity and the hollow core to prevent the hollow core from moving within the cavity while the mold is being rotated. Such small pieces melt outside the core, and with the resin powders, form covering layer. At the final stage of this process, the small piece becomes a part of covering layer, and can no longer be discriminated.

The constitution and effect of this invention will be more clearly understood by below-mentioned examples.

EXAMPLE 1

By utilizing polyethylene powders as thermoplastic powders and a hollow globe made of iron plate as a core, this example was aimed at obtaining a float of hollow polyethylene globe having an iron globe as a core.

Figure 1:
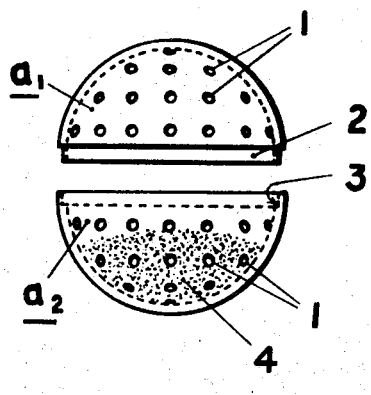
FIG. 1 is an elevational view showing a core employed in this invention.

To begin with, as shown in FIG. 1 an iron plate of approximately 1 mm. gauge was press-fabricated into hemispheres $a_1$ and $a_2$ and on the surfaces thereof 25 holes 1 of about 5 to 8 mm. in diameter each were drilled, then the two pieces of hemisphere were counter faced reciprocally to make a globe of approximately 290 mm. in outside diameter. At the margin where the hemispheres meet, stepped parts 2 and 3 were provided to enable them to couple.

Figure 2:
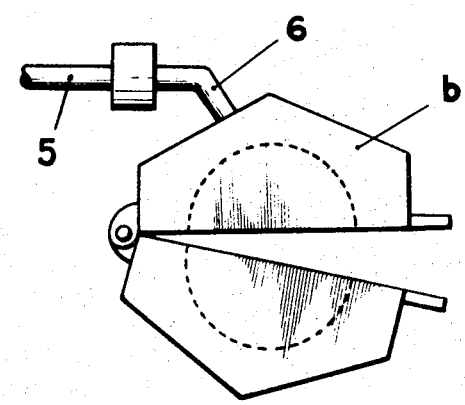
FIG. 2 is an elevational view of an example of the mold to be used in this invention.

As raw material, "Milason," a low density polyethylene powder made by Mitsui Polychemical Co., was used. Upon preparing 1.6 kg. of the polyethylene powders and welding the coupling section of the hollow globe with an iron welding rod, the resin powders 4 were poured through a hole of about 10 mm. in diameter on the core. Separately, a mold having a cavity of about 300 mm. diameter was prepared. As shown in FIG. 2, mold $b$ was fixed to the axis 6. Then, the axis 6 was fixed obliquely to the axis 5 which is rotatable. As a result, when the axis 5 rotates, the mold $b$ rotates around the axis 5.

Into the mold was placed the core containing the resin powders and the mold was closed. While the mold was being rotated at a rate of 20 revolutions per minute by rotating the axis 5, the mold was heated up to about 230° C. by burning oil (temperature in the furnace to be 300° C.) and maintained under the same conditions for 15 minutes.

Afterwards, while continuing the revolution, the mold was cooled. After cooling, the mold was opened and the molded article was taken out. It was then observed that the iron globe was completely covered with polyethylene.

Figure 3:
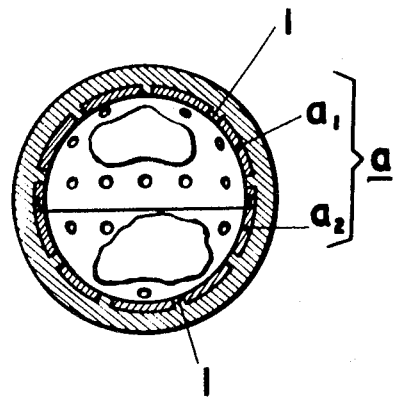
FIG. 3 is a sectional view of the hollow molded article manufactured by this invented process.

Later, the molded article was cut. It was confirmed that the cross section of the molded article was per FIG. 3 and the iron globe was completely covered with about 5 mm. thick polyethylene, and that the holes of the core were completely filled with polyethylene, and a small portion of polyethylene remained as thin layer on the inner surface of the core.

It was found that the molded article thus obtained could be utilized as a durable float for deep sea fishing.

EXAMPLE 2

By utilizing polypropylene powders as the resin and an aluminum hollow globe as a core, this example was aimed at obtaining a product having a layer of polypropylene on the core.

In practicing the manufacturing process, the apparatus as shown in FIG. 4 was employed in which the mold was rotated around two axes. In this apparatus, when axis 11 rotates in the direction of arrow X, the plate 14, by interlocking of gear 12 and 13 or 13', revolves around axis 11 in the direction of X and also on its axis in the direction of arrow Y. Accordingly, by attaching mold b to the plate 14, the mold was enabled to rotate around the two axes.

Figure 5:
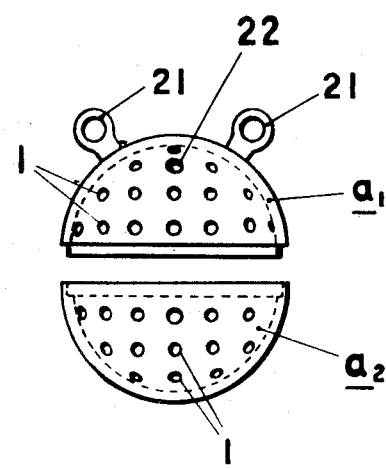
FIG. 5 is an elevational view showing another core to be used in this invention.

As a core, a hollow globe of aluminum composed of two hemispheres shown in FIG. 5 was used. Although the structure thereof is the same as that in Example 1, the only difference was that in FIG. 5 projecting parts 21 were provided on one side of the hemisphere and at the center of each projecting part, a hole was formed. On the surface of above core, numerous small holes of about 5 mm. in diameter were provided and a hole 22 was made slightly larger. Through this hole 22, 1.6 kg. of polypropylene powder was poured in.

Figure 6:
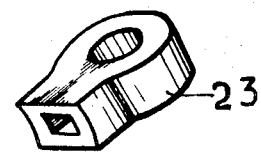
FIG. 6 is a perspective view of a cap used to cover a part of the core.
Figure 7:
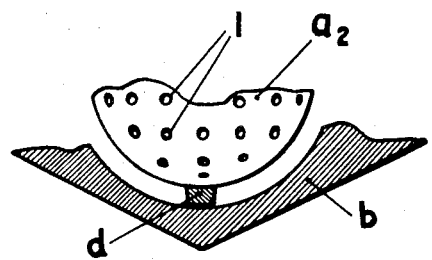
FIG. 7 is a fragmentary cross sectional view of one embodiment of this invention wherein a small piece made of thermoplastic resin is interposed between the core and the cavity surface.

A cap 23, made of polypropylene, was placed at the outside of each projecting part 21. The cap was premolded with polypropylene in the shape shown in FIG. 6. The shape of this cap is such that it can cover the projecting parts 21 of the core shown in FIG. 5, and it has the enough thickness to fill up the clearance between the projecting parts 21 and the mold cavity so that it prevents the core a from moving freely in the mold.

The core was placed in said mold, and the mold, while being rotated by means of apparatus shown in FIG. 4, was heated with hot air for 15 minutes at about 230° C. by mold temperature. Afterwards, it was cooled while continuing its rotation. The mold was opened and the molded article was taken out. Thus, a molded article in which the entire outer surface of the core as shown in FIG. 5 was covered with polypropylene in uniform thickness was obtained. It was suitable as a float for deep sea fishing, and the parts 21 added convenience for mooring.

EXAMPLE 3

This example was practiced just like the Example 2, except employing the apparatus in which the mold is rotated around two axes running through the center of said mold and crossing each other at right angle instead of the apparatus shown in FIG. 4, except for adding an operation of inserting a small piece of molded resin product $d$ between the hollow core $a_2$ and the mold cavity $b$, thus enabling a smooth practice of the invention.

EXAMPLE 4

Utilizing the mixture of low density polyethylene powder and high density polyethylene powder as resin powder and a hollow globe of iron as a core, it was aimed at covering in uniform thickness the entire surface of the globe with resin. The inside diameter of the mold cavity being used was designed to be a bit larger than the calculated diameter of the product to be obtained. Thus designed, an excellent product was obtained. The details of this experiment are as follows.

To make a core, iron plate of about 0.6 mm. in thickness was press-fabricated into a ball of about 290 mm. in outside diameter and all over the surface thereof small holes of about 3 mm. in diameter were drilled at intervals of about 50 mm. The weight thereof was about 1.1 kg.

As thermoplastic resin powders, 1.7 kg. of mixtures of low density polyethylene and high density polyethylene in a mixing ratio of 3 to 7, respectively, together with colour pigment added were prepared.

Separately, a mold was prepared and in it a cavity equivalent to the intended molded article was provided. Although the outside diameter of the intended molded article was about 300 mm., the inner diameter of said cavity was designed to be about 308 mm. in consideration of contraction of the resin.

Upon putting the resin into the core, the core was placed in the mold cavity and the mold was closed. The mold was heated while being rotated around two axes.

In this case, the two axes were so set up that they cross at right angle nearly at the center of the mold cavity, and one axis was revolved at 30 r.p.m. and the other at 15 r.p.m. Heating was done by placing the whole mold in a heating furnace. The temperature in the furnace was about 300° C. and the heating process was continued for about 15 minutes after the surface temperature of the mold has reached about 230° C. Toward the end of the heating process, resin was thought to be on the outside of the core and adhere to the inner surface of the mold cavity.

Thereafter, the mold was taken out of the furnace and left alone for some time for cooling without stopping the revolution and then, cooled forcibly by pouring cooling water thereon from the outside. In this process, the resin which had been contacting the surface of the mold cavity was thought to contract and, as a result, adhere to the outer surface of the core. Some portion of the resin located in the vicinity of the small holes of the core was thought to enter into the holes accomplishing the adhesion of the resin to the core. During this period, rotation of the mold was maintained.

After cooling, the mold article covered with resin was taken out of the mold. Releasing the molded article out of the mold was quite easily done. The obtained article was a true globe, the outside diameter of which being 302 mm., the weight of which being 2.8 kg. and the surface thereof being smooth and beautiful. When the molded article was cut, it was observed that only a small portion of the resin remained inside the core and the major portion was located outside of the core covering it with a uniform layer of about 0.65 mm. gauge. Further, it was confirmed that the adhesion of the resin layer to the core was perfect.

The molded article was suitable as a float for deep sea fishing.

EXAMPLE 5

Utilizing mixtures of low density polyethylene powder and high density polyethylene powder as resin powder, and a hollow globe made of thermoplastic resin which is called ABS (acrylonitrile-butadiene-styrene copolymer) resin as a core, it was aimed at covering in uniform thickness the entire surface of the globe with polyethylene. The inside diameter of the mold cavity for this experiment was designed to be a bit larger than the calculated diameter of the intended product.

As a core, a hollow globe made of two welded hemispheres, which were made of ABS resin by injection molding, was employed. Drilled on the surface thereof were numerous small holes just like the surface of the iron hollow globe used in Example 4. The outside diameter of the globe was 296 mm. and the weight thereof 1.75 kg.

As a resin powder, 1 kg. of mixtures of low density polyethylene powder and high density polyethylene powder in a mixing ratio of 3 to 7, respectively, with colour pigment added, were prepared.

Separately, a mold provided with a cavity of 308 mm. diameter was prepared. The diameter of the cavity was designed to be about 8 mm. larger than the outside diameter of intended molded article.

Upon putting the resin powder into the core, the core was placed in the mold and the mold was closed. The mold was heated while being rotated around two axes. In this case, the two axes were so set up that they crossed at right angles nearly at the center of the mold cavity, and one axis was revolved at 30 r.p.m. and the other at 15 r.p.m. Heating was done by placing the whole mold in a heating furnace. Since the core was made of thermoplastic resin, heating was done for a relatively long time at low temperature to prevent softening and deformation of the core. In practice, heating was maintained for about 20 minutes after the mold temperature has reached 210 to 220° C. Thereafter, while continuing rotation of the mold, the mold was rapidly cooled by pouring cooling water thereon.

After cooling, a molded article having a resin layer was taken out of the mold. The molded article was quite easily released from the mold. The obtained article was a true globe of 300 mm. in diameter having polyethylene resin layer covering uniformly the entire surface of ABS resin core. Also, the covering layer of polyethylene was firmly adhered to the hollow core.

The mold article was fit for use as a float for deep sea fishing.

What is claimed is:

1. A method of forming a hollow article comprising the steps of positioning in a rotatable and closable mold having a cavity of a shape desired for said hollow article, spaced from the wall of said cavity a perforated, hollow core of heat-resistant material in its solid state, also placing in said mold cavity in the space between said core and said wall and within the hollow core a quantity of a thermoplastic resin powder which when molten is sufficient to completely fill the space between the core and said wall of the cavity, closing said mold, heating said mold from the outside while rotating it until the resin powder is rendered fluid while said core remains in its solid state to allow the fluid resin to flow out of said core and completely fill said space between said core and said wall, and thence cooling the mold to solidify the resin.

2. A method of forming a hollow article according to claim 1 wherein said core is a hollow globe formed by coupling two hemispheres made of metal, and wherein said thermoplastic resin powder is polyethylene.

3. A method of forming a hollow article according to claim 1 wherein said core is a hollow globe fabricated by coupling two hemispheres made of acrylonitrile-butadiene-styrene copolymer, and wherein said thermoplastic resin powder is polyethylene.

4. A method of forming a hollow article according to claim 1 further comprising the step of interposing solid thermoplastic members between said core and said wall prior to the step of heating said mold to position said core with respect to said wall.

5. A method for forming a hollow article according to claim 4 wherein said core has at least one projecting portion and wherein said members are in the form of molded caps and wherein said method comprises the step of placing said caps over said projecting portions prior to the step of closing said mold.

References Cited
UNITED STATES PATENTS

| 937,178 | 10/1909 | Rentzsch | 264—275 |
| 2,300,441 | 11/1942 | Voit | 264—275 X |
| 3,246,069 | 4/1966 | Maynord | 264—310 X |
| 3,364,292 | 1/1968 | Lemelson | 264—310 X |
| 3,455,483 | 7/1969 | Inklaar | 264—310 X |

ROBERT F. WHITE, Primary Examiner

R. R. KUCIA, Assistant Examiner

U.S. Cl. X.R.
264—273, 310, 312